A. L. McGREGOR.
AUTOMOBILE BUMPER.
APPLICATION FILED MAR. 24, 1920. RENEWED DEC. 6, 1920.

1,369,253. Patented Feb. 22, 1921.

Inventor
Allan L. McGregor

UNITED STATES PATENT OFFICE.

ALLAN L. McGREGOR, OF CHICAGO, ILLINOIS.

AUTOMOBILE-BUMPER.

1,369,253.  Specification of Letters Patent.  Patented Feb. 22, 1921.

Application filed March 24, 1920, Serial No. 368,464. Renewed December 6, 1920. Serial No. 428,762.

*To all whom it may concern:*

Be it known that I, ALLAN L. McGREGOR, a citizen of the United States, and a resident of Chicago, in the county of Cook and State of Illinois, have invented certain new and useful Improvements in Automobile-Bumpers, of which the following is a specification.

This invention relates to improvements in automobile bumpers, and more particularly to a novel construction for the impact bar of a bumper.

The object of my invention is to provide a bumper having an impact member formed of resilient bar stock and preferably from a single bar of this material bent in such manner as to provide an impact member consisting of two horizontally spaced portions. A further object of the invention is to provide a suitable means for connecting together the free ends of the bar of which the impact member is constructed, such member also serving to connect the parallel portions together as well as to maintain them in spaced relation to each other.

The novel features embodying my invention are hereinafter more fully described and illustrated in the accompanying drawings, in which—

Figure 1:
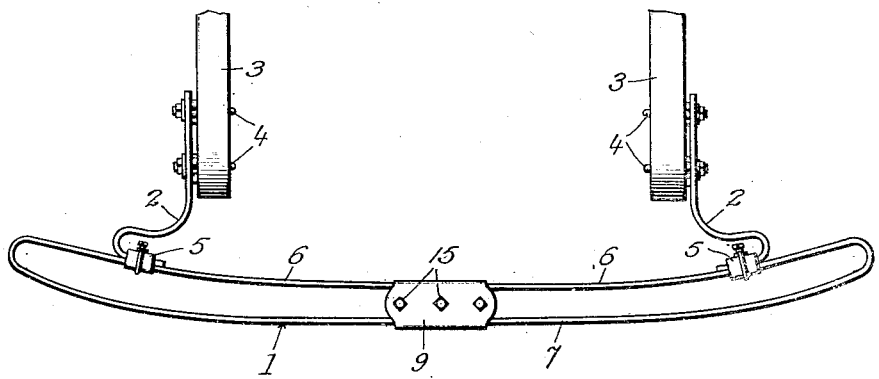
Figure 1 is a top plan view of a bumper attached to a vehicle frame.
Figure 2:
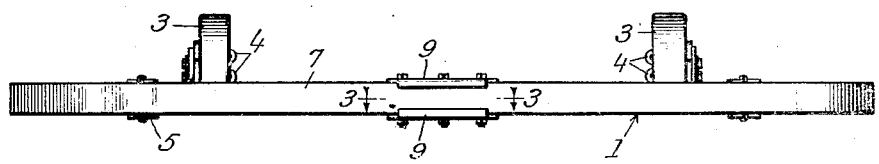
Fig. 2 is a front view in elevation of the bumper.
Figure 3:
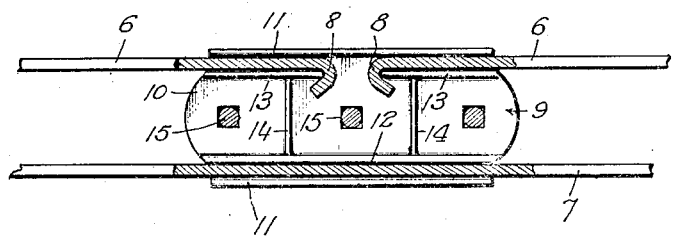
Fig. 3 is an enlarged detail view in horizontal section of the clamping and spacing member, as taken on line 3, 3 of Fig. 2.

A preferable construction of a bumper embodying the novel features of my invention comprises in general an impact member 1, hereinafter to be described more in detail, connecting bars 2, 2 adapted to be attached at their rear ends to the vehicle frame members 3, 3 by means of suitable clamping bolts 4, 4, said connecting bars being curved at their outer ends somewhat after the shape of the letter S, the free end portions thereof extending parallel to and abutting flatwise against a portion of the impact member 1, and rigidly secured or clamped thereto by means of clamping members 5, 5.

Referring more in detail to the impact member 1, the same, as hereinbefore suggested, is preferably constructed from a single or continuous bar of resilient metal which is bent at points corresponding to the ends of the impact bar into U-shape, the free end portions 6, 6, being thereby brought into substantially parallel and horizontally spaced relation to the intermediate portion 7, said intermediate portion forming the front or main impact member of the bar, whereas the free end portions provide a rearwardly spaced secondary or reinforcing member. These free end portions or rear sections terminate at their ends in close proximity to each other and immediately to the rear of the mid-point of the front impact member 7. At the extremities of the rear sections 6, 6 are formed hooked ends 8, 8 by bending the ends of the bars inwardly in the direction of the front bar 7 and backwardly.

As a means for connecting the hooked ends of the rear sections 6, 6 together, and likewise for joining the rear sections 6, 6 with the front section or member 7, I provide two plates 9, 9 for this purpose. These plates are generally designed to be clamped together in contact with the upper and lower edges of the several portions of the impact bar immediately adjacent to the central point thereof. Each one of these plates consists of a body portion 10 provided along its side margins with short flanges 11, 11 extending at right angles to the body portion 10. Spaced inwardly from one of the marginal flanges 11 is a parallel flange 12, and spaced inwardly from the opposite marginal flange 11 are two short flanges 13, 13, extending inwardly from the ends of the body member but spaced apart at their inner ends. Transverse reinforcing flanges 14, 14, extend between the flange 12 and the opposing flanges 13, 13, preferably in close proximity to the inner ends of said flanges 13, 13. Between the flanges 11 and 12 is formed a channel adapted to receive the marginal portions of the front bar 7, and similarly, between the opposite marginal flange 11 and its associated flanges 13, 13 are formed channels adapted to receive the end portions of the rear sections 6, 6, the hooked extremities 8, 8 engaging and being locked to the inner ends of the flanges 13, 13.

As before suggested, each of the plates is applied to the bars 6 and 7 in the manner indicated, namely, one below and one above, in vertically alined relation to each other, and the two plates securely connected together by means of bolts 15 extending vertically through the plates at suitable points between the pairs of flanges.

The two plates being securely clamped together, manifestly form a permanent lock for the free ends of the rear sections 6, 6 which cannot be disconnected other than by the actual breakage of the plates. It is obvious that when the impact member receives a blow at any point along the same, the tendency will be for the bars to be bent or bowed inwardly. The effect on the rear sections 6, 6 is obviously to be spread apart at their free ends, the result being that it is ordinarily difficult to secure a connection between said free ends which will prevent said free ends from being pulled out from the member joining them and thus become disconnected. The formation of the plates with channel forming flanges 11 and 13, the latter serving to engage the hooked extremities, provides a permanent locking connection between the ends of the rear sections 6, 6 which will resist the pulling out of the free ends of the same so long as the plates are capable of resisting breakage. Furthermore, the plates provide a rigid connection between the rear sections 6 and the front section 7, thereby maintaining these parts in permanent alinement and preventing the permanent distortion throughout any portion of the impact member.

The features of my invention are manifestly applicable to different forms of bumpers, and therefore I do not wish to be limited either in its mode of application or in its details of construction, except in so far as the invention is specifically set forth in the appended claims.

I claim as my invention:

1. In an automobile bumper, the combination of an impact bar comprising end sections meeting intermediate the ends of the bar in disconnected hooked extremities, and a plate adapted to be clamped to said bar over said hooked extremities, and provided with members adapted to be engaged by said hooked extremities.

2. In an automobile bumper, the combination of an impact member comprising parallel bars, one of said bars comprising end sections meeting intermediate the ends of the impact member in disconnected hooked extremities, and a plate clamped edgewise over said bars and provided with integral projections engaged by said hooked extremities.

3. In an automobile bumper, the combination of an impact bar comprising end sections meeting end to end in disconnected hooked extremities, and a plate adapted to be clamped over the free ends of said bar and provided with longitudinal flanges forming a channel embracing said free ends of the bar, the adjacent ends of said flanges being engaged by said hooked extremities.

4. In an automobile bumper, the combination of an impact member comprising a single bar bent double to form front and rear impact bars, the free ends terminating adjacent the central portion of the impact member and provided with hooked extremities, a plate clamped over the edges of said bars adjacent said free ends, and provided with flanges arranged end to end in spaced relation, the adjacent ends thereof being engaged by said hooked extremities.

5. In an automobile bumper, the combination of an impact member comprising a single bar bent double to form a front and rear impact bar, the free ends terminating in hooked extremities adjacent the central portion of the front impact bar, and companion plates clamped against the edges of said bars and provided with pairs of parallel flanges forming channels embracing said bars, said hooked extremities engaging the adjacent ends of two of said flanges arranged end to end.

6. In an automobile bumper, the combination of an impact member formed of a single bar bent double to provide two spaced portions, the ends of said bar being brought together intermediate the ends of the impact member and the extremities bent into hook shape, and companion plates clamped edgewise over the portions of the bars adjacent the ends thereof, and having longitudinal channels embracing said bars, and transverse projections adapted to be engaged by said hooked extremities.

In witness whereof, I hereunto subscribe my name this 20th day of March, A. D., 1920.

ALLAN L. McGREGOR.